(12) United States Patent
Yeap et al.

(10) Patent No.: US 12,361,257 B2
(45) Date of Patent: Jul. 15, 2025

(54) ELECTRICAL CIRCUIT FOR A SMART CARD CHIP MODULE, SMART CARD CHIP MODULE AND METHOD FOR MANUFACTURING A SMART CARD CHIP MODULE

(71) Applicant: Linxens Holding, Mantes-la-Jolie (FR)

(72) Inventors: Yean Wei Yeap, Mantes-la-Jolie (FR); Wen Qiang Chin, Mantes-la-Jolie (FR)

(73) Assignee: Linxens Holding, Mantes-la-Jolie (FR)

( * ) Notice: Subject to any disclaimer, the term of this patent is extended or adjusted under 35 U.S.C. 154(b) by 171 days.

(21) Appl. No.: 18/017,491

(22) PCT Filed: Jul. 24, 2020

(86) PCT No.: PCT/IB2020/000614
§ 371 (c)(1),
(2) Date: Jan. 23, 2023

(87) PCT Pub. No.: WO2022/018471
PCT Pub. Date: Jan. 27, 2022

(65) Prior Publication Data
US 2023/0274123 A1    Aug. 31, 2023

(51) Int. Cl.
*G06K 19/077*    (2006.01)
(52) U.S. Cl.
CPC . *G06K 19/07783* (2013.01); *G06K 19/07743* (2013.01); *G06K 19/07747* (2013.01); *G06K 19/07754* (2013.01)

(58) Field of Classification Search
CPC ....... G06K 19/07783; G06K 19/07743; G06K 19/07747; G06K 19/07754
See application file for complete search history.

(56) References Cited

U.S. PATENT DOCUMENTS

| | | | |
|---|---|---|---|
| 11,250,306 B2 | 2/2022 | Calvas et al. | |
| 2014/0014732 A1 | 1/2014 | Finn et al. | 235/492 |
| 2015/0186769 A1 | 7/2015 | Boiron et al. | |
| 2019/0392283 A1* | 12/2019 | Finn | G06K 19/0723 |

FOREIGN PATENT DOCUMENTS

| CN | 104603798 A | * | 5/2015 | ....... G06K 19/07749 |
|---|---|---|---|---|
| EP | 3005846 A1 | | 12/2014 | |
| WO | WO-2019102079 A1 | | 5/2019 | |

* cited by examiner

*Primary Examiner* — Henry Luong
(74) *Attorney, Agent, or Firm* — McCarter & English, LLP

(57) ABSTRACT

Electrical circuit for a smart card chip module, including an insulating layer having a front main face and a rear main face. An antenna is made in a first conductive layer laying on the rear main face. This antenna extends over an antenna area delimited by a peripheral edge. The antenna includes at least one inner loop and one outer loop. The outer loop runs along the peripheral edge except over at least one first connecting segment diverted from the peripheral edge, towards or in a central zone of the antenna area. Further, the outer loop of the antenna includes at least a second connecting segment diverted from the peripheral edge towards a central zone of the antenna area.

12 Claims, 2 Drawing Sheets

ELECTRICAL CIRCUIT FOR A SMART CARD CHIP MODULE, SMART CARD CHIP MODULE AND METHOD FOR MANUFACTURING A SMART CARD CHIP MODULE

CROSS REFERENCE TO RELATED APPLICATION

This patent application is a U.S. National Stage application of International Patent Application Number PCT/IB2020/000614 filed Jul. 24, 2020, which is hereby incorporated by reference in its entirety.

FIELD OF INVENTION

The invention relates to the field of smart cards and more particularly to the field of electronic modules for smart cards.

Smart cards have multiple uses: credit cards, SIM cards for mobile phones, transport cards, identity cards, etc.

Smart cards usually consist of a rigid carrier or support, e.g. made of plastics, which forms the body of the card, in a cavity of which a separately manufactured electronic module, also called chip module, is accommodated. This chip module comprises, for example, a flexible electrical circuit with an electronic chip (integrated circuit) and means for connecting the chip to a device for reading and/or writing data recorded in the chip.

The invention relates in particular to the field of so-called "Dual" cards, i.e. having dual communication interfaces with the chip. In other words, these cards allow communication with or without contacts. They are also called "Combi" cards.

For use "with contacts", the contacts are connected to the chip and are located on one side of the module so as to be flush with the card surface and to allow electrical connection to a reading and/or writing device when the card is inserted into this device.

There are two types of dual cards for "contactless" use.

According to the first type of card, an antenna placed (i.e. integrated, embedded, etc.) in the card body is electrically connected to the chip. In this case, the chip can exchange data with a read/write device, either by making a direct electrical connection between the read/write device and the module contacts, or by making a direct electromagnetic communication (for example using a near field communication—NFC—technology) between the antenna and the read/write device.

According to the second type of card, a first antenna, known as the "module antenna" is integrated in the module and allows electromagnetic coupling, by inductive coupling (therefore without electrical connection) with a second antenna, known as the "booster or master antenna", embedded in the rigid card body mentioned above. The first antenna is smaller than the second antenna. The second antenna can cover a larger area of the card body than the module. This provides a range of greater communication distances. Also in this case, the chip can exchange data with a read/write device, either by making a direct electrical connection between the read/write device and the module contacts, or by making an electromagnetic communication between the module antenna and the booster antenna on the one hand, and the booster antenna and the read/write device on the other hand. The module antenna thus communicates (with a resonance effect) with a contactless read and/or write device via the booster antenna. Therefore, the only physical connections in this second type of dual cards are at the module level, between the chip and the contacts and between the chip and the module antenna. All these connections are made on the module. This avoids having to make a physical interconnection between the antenna incorporated in the card body and the chip incorporated in the module.

For example, the international patent application WO2014016332A1 describes a module comprising a flexible electrical circuit comprising an insulating layer with a front face supporting contacts and a rear face supporting the chip and the module antenna. Holes (also called "vias") can be then made through the insulating layer, the internal surface of these holes being metallized to electrically connect the front and rear faces of the module. The chip is connected to the contacts and the module antenna with a wire bonding or with a flip-chip technique.

In order to facilitate the integration of the module in the card, the antenna must be contained in a module having dimensions defined by the ISO 7816-2 standard. Within these dimensions, must be provided on the rear face of the module: an area for placing the chip, areas for holes, an area with connection pads or bonding pads for connecting the chip to the contacts and the antenna. In addition, the antenna loops must be made in sufficient number, with a certain width and with a minimum distance between the loops to obtain the electromagnetic characteristics to achieve the desired resonant frequency. For example, the higher the number of loops, the higher the inductance.

The invention aims at providing more flexibility to adapt the antenna characteristics to the chip specifications. The invention possibly also aims at providing a module antenna with higher inductance.

SUMMARY

According to a solution an electrical circuit according to claim 1 is disclosed.

Indeed, diverting at least two segments from the peripheral edge provides a longer antenna.

The disclosed electrical circuit may also optionally include one and/or the other of the features of any one of claims 2 to 9.

The disclosure also relates to a chip module according to claim 10, as well as a method for manufacturing chip module according to claim 11 or 12.

BRIEF DESCRIPTION OF THE DRAWINGS

Other features, objects and advantages of the invention will become apparent from reading the detailed description that follows, and the attached drawings, given as non-limiting examples and in which.

DETAILED DESCRIPTION

An example of an electrical circuit embodiment is described below.

Figure 1:
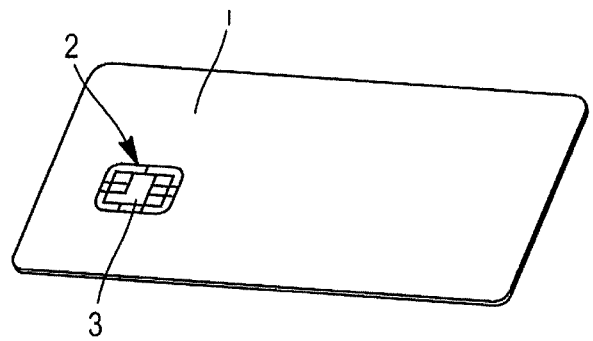
FIG. 1 schematically shows in perspective an example of a smart card accommodating a chip module.

A contact and contactless smart card 1 comprising a module 2 is shown in FIG. 1. The module 2 includes, in particular, an electrical circuit 3 and a chip 100 (not visible in FIG. 1). The module 2 is manufactured as a separate component which is inserted into a recess milled in the body of the card 1. A booster antenna (not shown) is integrated into the body of card 1 in a known manner.

Figure 2:
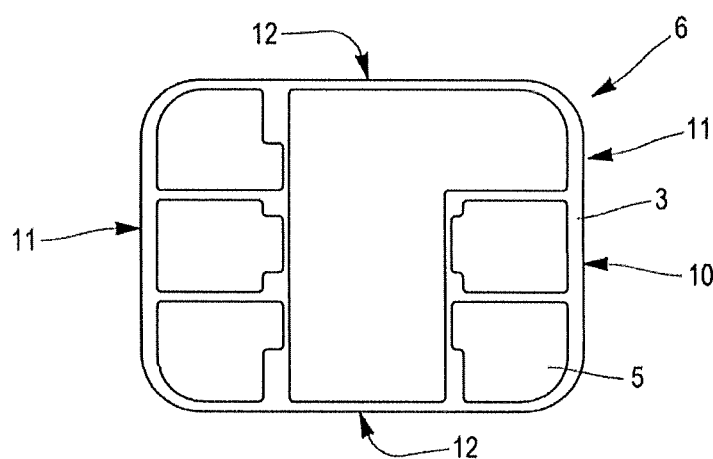
FIG. 2 is an elevation of the front face of an example of a chip module for a smart card such as the one shown in FIG. 1.
Figure 3:
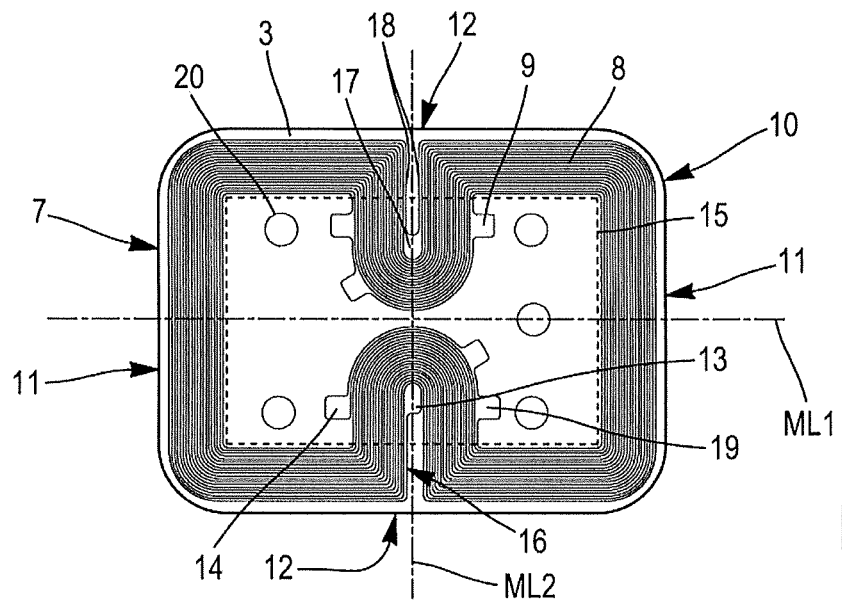
FIG. 3 is an elevation of the rear face of the example of a chip module shown in FIG. 2.
Figure 4:
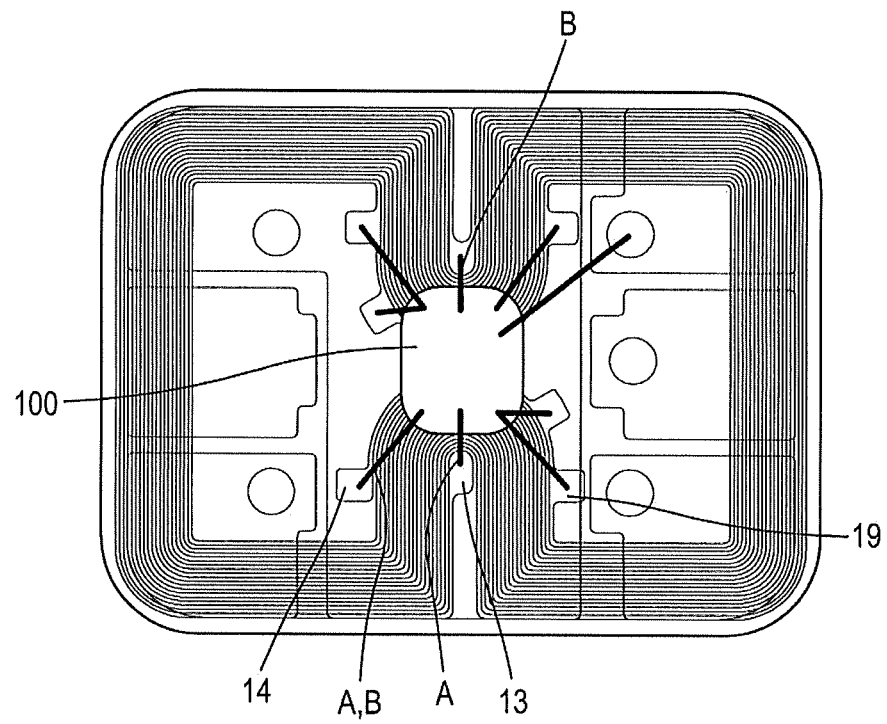
FIG. 4 is a schematic illustration of various solutions for connecting the chip.

The front side 6 (i.e. contact side) of the electrical circuit 3 is shown in FIG. 2. The rear side 7 (bonding side) of the electrical circuit 3 is shown in FIG. 3. The electrical circuit 3 shown in FIGS. 2, 3 and 4 is a double-sided printed circuit board, with contacts 5 on the front face 6 and an antenna 8 on the rear face 7. The contacts 5 are made in a first conductive layer (e.g. a copper, a copper alloy, an aluminum, an aluminum alloy layer) laying on the front face 6 of an insulating layer (e.g. epoxy glass, paper, PET, PEN or polyimide). The antenna 8 and connecting pads 9 are made in a second conductive layer (e.g. a copper, a copper alloy, an aluminium, an aluminum alloy layer) laying on the rear face 7 of the insulating layer. The first and/or second conductive layer(s) can be plated with at least one of the following metals: nickel, gold, palladium or silver.

In fact, only a portion of the electrical circuit 3 is shown in the figures. This portion corresponds essentially to the portion of the electrical circuit 3 needed to make a module 2. Several similar portions can be supported by the same flexible substrate, for example for a continuous (i.e. "reel-to-reel" or "roll-to-roll") implementation of the process according to the invention. A module 2 is defined on the electrical circuit 3 by a peripheral edge 10. The peripheral edge 10 of a portion of the electrical circuit 3 corresponding to a module 2 has a rectangular shape with a rounded corner between two adjacent sides 11, 12. The peripheral edge 10 comprises two short sides 11 corresponding to the two shortest sides of the rectangular shape, and two long sides 12 corresponding to the two longest sides of the rectangular shape.

The electrical circuit 3 has several contacts 5 to which a chip 100 will be connected (see FIG. 4). For example, each module 2 of the electrical circuit 3 comprises six contacts 5. One of this contact is L-shaped and extends between two rows of other contacts 5.

For example, the antenna 8 has about ten to thirteen loops. The loops have a width of for example 40 to 100 micrometres. The gap between the loops is for example 25 to 100 micrometres wide. The antenna 8 extends between a start connecting pad 13 and final connecting pad 14. The final connecting pad is directly connected to the inner loop of the antenna 8 ("Directly" means without antenna or any other connecting portion between the antenna trace and the final connecting pad 14, i.e. one side of the connecting pad 14 corresponds to the antenna trace). The start connecting pad 13 is located close to or in a central zone of the antenna 8 where the chip 100 will be attached. In this document, the central zone 15 is defined as the region of the module 2 delimited by the inner loop of the antenna but its U-shape inner portions (see the dotted line on FIG. 3). The start connecting pad 13 is close enough from the centre point of the module so as to reduce the length of the wire electrically connecting the chip 100 to the antenna 8. From the start connecting pad 13, the antenna 8 forms a first connecting segment 16 extending essentially perpendicular to the longest sides 12. The first connecting segment 16 diverts the outer loop of the antenna 8 from one of the longest sides 12, in the central zone 15.

The antenna 8 also has an intermediate connecting pad 17 which is essentially symmetrical to the start connecting pad 13 with regard to a median line ML1 joining and crossing the two shortest sides 11 in their middle. This median line ML1 also corresponds to the intersection between the plane within which the antenna lies and a plane perpendicular to the latter ("the latter" corresponding to the antenna plane).

The intermediate connecting pad 17 is located in the central zone 15 of the antenna 8. The intermediate connecting pad 17 is close enough from the centre point of the module 2 so as to reduce the length of the wire electrically connecting the chip 100 to the antenna 8. From the intermediate connecting pad 17, the antenna 8 forms two second connecting segments 18 extending essentially perpendicular to the longest sides 12. The second connecting segments 18 divert the outer loop of the antenna 8 from one of the longest sides 12, in the central zone 15. The first and second connecting segments 16, 18 extend parallel to each other. The first and second connecting segments are each respectively directly electrically connected to a connecting pad 13, 17 ("Directly" means without antenna or any other connecting portion between the antenna trace and the connecting pad 13 or 17, i.e. one side of the connecting pad 13 or 17 corresponds to the antenna trace).

The antenna 8 comprises loops with straight portions essentially parallel to respective sides 11, 12 of the peripheral edge 10, curved portions in the corners of the peripheral edge 10 and U-shaped inner portions essentially in the middle of the longest sides 12. These U-shaped inner portions bypass the start and intermediate connecting pads 13, 17. The U-shaped inner portions extend on the rear face 7 over an area covered on the front face 6 by the L-shaped contact (see FIG. 4). The general shape of the loops is essentially symmetrical with regard to the median line ML1 joining and crossing the two shortest sides 11 in their middle, as well as with regard to another median line ML2 joining and crossing the two longest sides 12 in their middle. Inner connecting pads 19 are directly electrically connected to the inner loop of the antenna and do not necessarily follow the same symmetry ("Directly" means without antenna or any other connecting portion between the antenna trace and the considered connecting pad 19, i.e. one side of the considered connecting pad 19 corresponds to the antenna trace). Their respective positions are rather symmetrical with regard to the centre of the module 2. The centre of the module corresponds to the intersection point of the median lines ML1, ML2 joining and crossing respectively the two shortest sides 11 and the two longest sides 12 in their middle.

The symmetry of the antenna 8 improves the surface current and the magnetic field detected or generated by the antenna 8

The antenna loops form two supporting zones astride of which the chip 100 can be placed, these two supporting zones being located between the connecting segments 16, 18. That is, the U-shaped inner portions extend in the central area 15 and form a coplanar structure of at least 1.5×1.5 square millimetres, onto which the chip can be attached. This coplanar structure avoids issues that can possibly be consecutive to the tilting of the chip 100.

Holes 20 are formed through the insulating layer, on either side of the area covered on the front face 6 by the longest branch of the L-shaped contact. Each one of these holes has an internal cylindrical wall which can be plated with an electrically conductive material (although this is not necessary in this invention). The bottom of each hole 20 is also closed by the first conductive layer. These holes 20 are used for connecting the chip 100 to the contacts 5. These holes can be manufactured without conductive rings. One can refer for example to the patent document FR3006551B1 for a disclosure of method for making such bonding holes without conductive ring. The absence of conductive rings leaves more room for increasing the number of antenna loops and/or the number of inner connecting pads 19. This also provides more flexibility for positioning the inner connecting pads 19. This also reduces surface currents that would circulate in the rings and would generate interferences with the magnetic field detected or generated by the antenna 8.

As shown on FIG. 4, the antenna configuration described above allows for various connecting routes (of course, not all the connections shown in FIG. 4 between the chip 100 and the connecting pads 13, 14, 17, 19 are made for an actual product. The chip 100 is connected to the antenna with two connecting pads only). One of the antenna bonding pads of the chip can be either connected to one of the start and intermediate connecting pads 13, 17, while another antenna bonding pad of the chip is connected with to the final connecting pad 14 or one or the other of the inner connecting pads 19 (see for example routes A and B in FIG. 4). These various connecting routes connect the chip to various lengths of antenna. As a consequence, this allows not only to adapt to chip characteristics such as the chip inductance, but also to the various locations of the antenna bonding pads on the chip that change from a commercial chip to another. In particular, a connection of the chip 100 between the start 13 and the intermediate 17 connecting pads makes possible to use shorter wires. In other words, depending on the chip specifications, the chip 100 can be connected to the antenna 8, using various pads. For example, the chip 100 has a pad which is either connected to one connecting pad directly connected to the first connecting segment 16 or to another one connecting pad directly connected to the second connecting segments 18. Similarly, depending on the chip specifications, the chip 100 can also be connected to one connecting pad 14, 19 directly connected to the inner loop or to another one connecting pad directly connected to the inner loop.

Due to the absence of conductive rings around the holes, it is possible to lower the wires without risk of short-circuit. This also allows to increase the speed of the wire bonding process.

Figure 5:
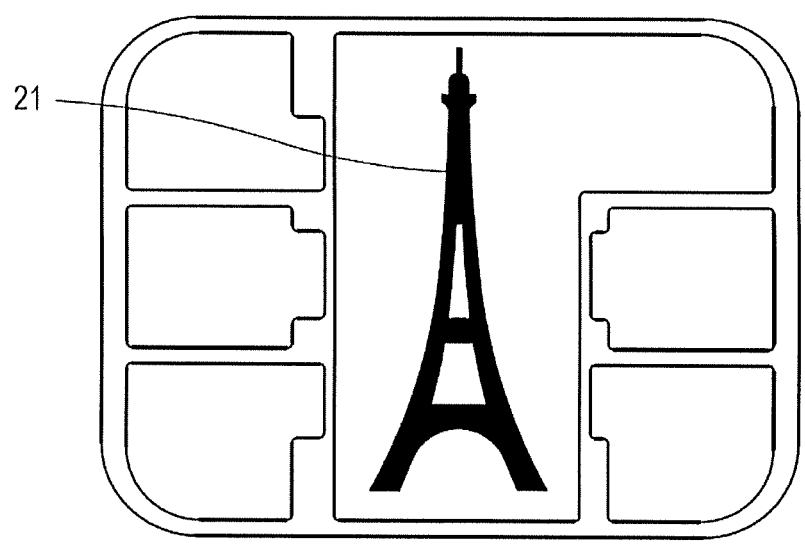
FIG. 5 is an elevation of the front face of a variant of the example of chip module shown in FIG. 2.

As a variant of the electrical circuit 3 described above, the L-shaped contact has one or several cut-out(s), which can correspond to a logo 21 (see FIG. 5). Such cut-outs can allow increasing the inductance by 0.3 or 0.4 microHenry, for example.

The invention claimed is:

1. An electrical circuit for a smart card chip module, comprising an insulating layer having a front main face and a rear main face, with an antenna defined in a conductive layer laying on the rear main face, the antenna extending over an antenna area delimited by a peripheral edge, the peripheral edge having a general rectangular shape, the antenna comprising at least one inner loop or one outer loop, the outer loop running along the peripheral edge except over at least a first connecting segment and at least a second connecting segment, both the first connecting segment and the second connecting segment being diverted from the peripheral edge, towards or in a central zone of the antenna area, wherein the first and second connecting segments are each respectively directly electrically connected to a connecting pad, the first connecting segment and the second connecting segment are respectively located on one side of a plane perpendicular to the antenna area, passing through a center of the antenna area and through the middle of two opposite sides of the rectangular shape, and the antenna is essentially symmetrical with regard to said plane.

2. The electrical circuit according to claim 1, wherein at least one of the first connecting segment or the second connecting segment is directly electrically connected to a connecting pad.

3. The electrical circuit according to claim 1, wherein the inner loop comprises two inner portions, the two inner portions extending in the central zone of the antenna area, passing between the first connecting segment and the second connecting segment.

4. The electrical circuit according to claim 1, wherein the first connecting segment and the second connecting segment are diverted from a section of the peripheral edge located respectively in the middle of one of its two other sides.

5. The electrical circuit according to claim 1, comprising contact pads defined in another conductive layer laying on the front main face, at least one of the contact pads having at least one cut-out opposite the antenna area.

6. The electrical circuit according to claim 1, comprising contact pads defined in another conductive layer laying on the front main face, at least one of the contact pads being connected to a bonding hole passing through the insulating layer.

7. The electrical circuit according the claim 6, wherein said bonding hole has no conductive ring surrounding it on the rear main face.

8. The electrical circuit according to claim 1, wherein the antenna loops form at least two supporting zones astride of which a chip can be placed, the two supporting zones being located between the first connecting segment and the second connecting segment.

9. The smart-card chip module, comprising an electrical circuit according to claim 1 and a chip connected to a connecting pad directly connected to one of the first connecting segment and the second connecting segment, and to another connecting pad directly connected to the inner loop.

10. A method for manufacturing a chip module, comprising:

providing an insulating layer having a front main face and a rear main face, with an antenna defined in a conductive layer laying on the rear main face, the antenna extending over an antenna area delimited by a peripheral edge, the peripheral edge having a general rectangular shape, the antenna comprising at least one inner loop or one outer loop, the outer loop running along the peripheral edge except over at least one of the first connecting segment or the second connecting segment, both the first connecting segment and the second connecting segment being diverted from the peripheral edge, towards or in a central zone of the antenna area, wherein the first and second connecting segments are each respectively directly electrically connected to a connecting pad, the first connecting segment and the second connecting segment are respectively located on one side of a plane perpendicular to the antenna area, passing through a center of the antenna area and through the middle of two opposite sides of the rectangular shape of the peripheral edge, the antenna is essentially symmetrical with regard to said plane, the method further comprises connecting the chip to the antenna, and wherein, depending on the chip specifications, the chip is either connected to a connecting pad directly connected to the first connecting segment, or to another connecting pad directly connected to the second connecting segment.

11. The method for manufacturing according to claim 10, wherein, depending on the chip specifications, the chip is either connected to a connecting pad directly connected to the inner loop or to another connecting pad directly connected to the inner loop, the choice between said connecting pad and said another connected pad defining two different lengths of antenna.

12. The electrical circuit according to claim 1, wherein the two opposite sides of the rectangular shape are each adjacent to the sides of the perpendicular edge from which the first connecting segment and the second connecting segment are diverted.

* * * * *